United States Patent
Kan et al.

(10) Patent No.: US 7,089,565 B2
(45) Date of Patent: Aug. 8, 2006

(54) SOFTWARE ARCHITECTURE FOR PROVIDING A CONNECTION HANDLE ASSOCIATION

(75) Inventors: Teresa C. Kan, Rochester, MN (US); Peter J. Schommer, Rochester, MN (US); Christopher P. Vignola, Port Jervis, NY (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 10/153,963

(22) Filed: May 23, 2002

(65) Prior Publication Data

US 2003/0221021 A1    Nov. 27, 2003

(51) Int. Cl.
  G06F 3/00 (2006.01)
  G06F 9/44 (2006.01)
  G06F 9/46 (2006.01)
  G06F 13/00 (2006.01)
  G06F 15/16 (2006.01)

(52) U.S. Cl. ............ 719/315; 709/227; 709/228

(58) Field of Classification Search ......... 709/203, 709/227–228; 707/2; 719/315
See application file for complete search history.

(56) References Cited

U.S. PATENT DOCUMENTS

| 6,411,986 B1 * | 6/2002 | Susai et al. ............ 709/203 |
| 6,434,543 B1 * | 8/2002 | Goldberg et al. ............ 707/2 |
| 6,850,982 B1 | 2/2005 | Siegel ............ 709/227 |

FOREIGN PATENT DOCUMENTS

WO    WO 01/76175 A2 * 10/2001

OTHER PUBLICATIONS

Mogul, J.C., "The Case for Persistent Connection HTTP," Computer Communication Review Conference, Aug. 1995, vol. 25, No. 4, pp. 299-313.

* cited by examiner

Primary Examiner—William Thomson
Assistant Examiner—Qing-Yuan Wu
(74) Attorney, Agent, or Firm—Bockhop & Associates LLC

(57) ABSTRACT

A system and method for providing a reusable connection handle to managed connections within transactions, or other scoping mechanisms, preferably in a Java 2 Enterprise Edition (J2EE) software architecture on a computer platform. The system and method further allows for multiple connection handles to share the same managed connection within, but not outside of, the confines of the scoping mechanism. The connection handle is selectively disassociated from a managed connection whereby the connection handle enters a disassociated state, and then is selectively reassociated with a managed connection within the software architecture when desired.

14 Claims, 1 Drawing Sheet

SOFTWARE ARCHITECTURE FOR PROVIDING A CONNECTION HANDLE ASSOCIATION

BACKGROUND OF THE INVENTION

1. Field of the Invention

The present invention generally relates to computer systems and software. More particularly, the present invention relates to a system and method of providing a reusable connection handle for connections, which operate within a particular sharing scope, preferably within a Java 2 Platform, Enterprise Edition (J2EE) software environment.

2. Description of the Prior Art

The Java 2 Platform, Enterprise Edition (J2EE) is a software standard for developing multitier enterprise applications. The J2EE architecture has a client tier, middle tier, and back-end tier. The client tier supports a variety of client types, and the middle tier supports client services and business logic through Web and Enterprise Java Beans (EJB) containers in the middle tier. The back-end tier includes the enterprise information systems (EIS) in the EIS tier and many standard APIs for accessing databases. One of skill in the art can accordingly alter the objects and components resident on the several tiers. "Containers" are standardized runtime environments that provide services to components on the platform. All containers provide runtime support for responding to client requests and returning results to clients. The containers also provide APIs to support user session management. One of the APIs provided in the J2EE platform is the Java Naming and Directory Interface (JNDI) which is the API for accessing information in enterprise name and directory services.

Resident within the J2EE architecture is the "resource adapter" that plays a central role in the integration and connectivity between an EIS and an application server and serves as the point of contact between application components, application servers and enterprise information systems. A resource adapter and other components, must communicate with one another based on the well-defined "contract" defined by the J2EE Connector Architecture. To enable seamless integration with an application server, a resource adapter abides by system-level contracts defined by the connector architecture. These contracts exist between the application server and the EIS, and are implemented through the resource adapter. The contracts specify how a system external to the J2EE platform integrates with it by supporting basic functions handled by the J2EE container. There are three major contracts: the "connection management contract" which allows applications to connect to an EIS, and enables the application server to utilize pooling; the "transaction management contract" which allows an application server to manage and perform transactional access across one to many EIS resource managers; and the "security contract" which provides support for secure access to the EIS.

On a J2EE platform, a "ManagedConnection" interface provides an application-level connection handle from the EIS to the resource adapter's ManagedConnection instance. The interface also provides methods, such as "cleanup," to reinitialize the instance and free resources after communication ceases. The instance does not close the connection, however, as such function is required by the application server so connection pooling can be utilized. Thus, a Connection Manager's (CM) job, within a Web Application Server, is to acquire, on behalf of users, connections to various backend resource managers (RMs), such as DB2, involve the resource manager in the server's transactions, and manage the connection life cycle, which includes pooling the connection and resources for reuse. In addition, the Java 2 Connector (J2C) architecture specification defines two characteristics of how connections can be rendered by the CM to the user: shareable and non-shareable. Also, within the J2C Architecture, the CM interacts with the Resource Adapter to create and destroy connections and receive notifications about life cycle events regarding the usage of that connection. The CM requests that the RA create a ManagedConnection (MC) that the CM manages. From the managed connection the CM obtains a "connection," or "handle" to the connection, which the CM then hands back to the requesting user. When users request non-shareable connections within the J2EE platform, the CM ensures that only one handle is handed out for a specific MC. And for shareable connections, more than one handle for a specific MC can be allocated by the CM and several users can share that MC. The sharing ability of connections allows the J2EE platform to have excellent performance and utilization of system resources.

The J2C specification also permits users to hold connection handles across multiple sharing scopes (i.e., multiple transactions) because the users should be able to iteratively access the resources in the same manner without having to obtain a new connection handle. In the case of shareable connections, it is very desirable to only allow sharing within a well-defined sharing scope. As an example, when multiple handles are used within the same transaction, the handle can share a single MC (assuming the usage properties are the same). Consequently when a sharing scope ends, it is insured that the handle is no longer associated with the managed connections to avoid unnecessary allocation of resources and to avoid future uses of the handles in different sharing scopes while being associated with the same MC. However, the system must also insure that the next time the user requires use of the handle the user holds, the handle is associated to an appropriate MC in a transparent fashion. A problem accordingly arises in that it is difficult to properly reassociate handles with managed connections when the sharing boundary ends.

The J2C specification however provides no means by which a handle can be "disassociated" when the sharing boundary, such as a transaction, goes out of scope. The J2C connection handle only has one active state and must be associated with a MC. If the handle is not associated with an MC it is in an invalid state and is no longer usable. In the prior art, if nothing special is done, when the sharing scope/transaction ends, a cleanup method is called on the MC and the MC is returned to the free pool. The cleanup call forces all handles associated with that MC into an invalid state, thus the next time the user tries to use that handle, the user will get an exception.

To avoid this, in the existing architecture, the handle associated with a MC is "parked" before the cleanup call is made, thus keeping the handles valid. In operation, when a connection handle is first assigned to a user, it is in a state such that it is associated with a MC. The MC provides a method, called "associateConnection( )" which allows a connection handle that is associated with a MC to be associated with a new MC. "Parking" refers to the process by which the application server gets a connection specifically to allow handles, which are currently not actively being used, to be associated with it, or a "parking connection." At some time before the end of the sharing scope, and thus before the cleanup method is called on the MC, all handles must be "parked" against the "parking connection" via the MC's associateConnection method. Then when the cleanup method is called on the MC there are no longer any handles associated with it and no handles become invalid. Before the user of the handle may desire to use the handle again, the handle will have to be moved off of the parking MC and on to an MC appropriate for the current sharing scope the user is entering, i.e. a "reassociation" occurs. Unfortunately, significant performance overhead is possible because a component may hold multiple handles. When a method is requested to run on the component, the container does not know if any or all of the handles will actually be used, thus the container must reassociate all handles even if they are not used. Furthermore, when the method ends, if the end of the method also corresponds to the end of the sharing scope, or the sharing scope ends, the container must then park all handles the component holds, even if those handles were not used.

Summarizing the prior art system on a J2EE platform, just prior to the end of a sharing scope of a transaction, the user's handle is reassociated to a "parking" connection to keep the connection handle valid and thus transferable on the platform. Then the MC cleanup method is called and the ManagedConnection is put back in the free pool. Next, prior to a method call on the user's component (the component holding the connection handle(s)), because the user might require the use of one of its connection handle(s), the call on the component is intercepted (during preinvocation processing) and the handle is reassociated off of the parked connection and onto a valid connection for the current sharing scope.

The prior art solution provides several problems in operation due to its significant performance overhead. One problem occurs since all connections are used within a component, such as an Enterprise Java Bean (EJB), and an entity (called a "container") that manages the life cycle of these components and intercepts all calls to the components use up significant system resources in managing connection handle association. In the prior art system, when a sharing boundary for a resource ends, any handle to connections involved in that sharing boundary will need to be "parked" to a different MC such that the current MC with which the handle is associated is able to have the cleanup method called without invalidating the associated handle(s) before the MC is placed into the free connection pool. This explicit protocol must be used because a shareable connection cannot be used outside of a sharing boundary, otherwise if two components share a connection in a sharing boundary after the boundary ends without parking the handle, both components could become involved in two different sharing boundaries which is an invalid operation. And if the MC is not timely released back to the free connection pool when the component is not using it, all of the available connections in the pool can become allocated with some users unable to acquire free managed connections.

Moreover, the ability to park connection handles requires that the container track information about the handles a particular component is using. Every time a method is called on a component, any handles that component contains will have to be put in a useable state, i.e. reassociated with a real connection in any currently active transaction, whether or not that method uses the handle. The prior art system thus requires significant overhead both in terms of tracking the handle information per component, and in retrieving a connection(s) when the connection was not before needed. Furthermore, if a component has more than one handle and a method is called within the scope of a global transaction, the connections are required to become part of a distributed, two-phase commit transaction, which has even greater associated performance overhead on the system even if neither of the handles is used. Therefore, the prior art system and method to manage connection handles through parking has unsatisfactory overhead demands.

It would therefore be advantageous to provide a software architecture within the J2EE platform, or like software platform, that allows the reassociation of handles without needing to park the handles and utilize significant system resources. Such system and method should minimize the possibility of causing an invalid transaction on the system from improperly maintaining the scope of a handle across a sharing boundary. It is to the provision of such an improved software architecture that the present invention is primarily directed.

SUMMARY OF THE INVENTION

The present invention is a system, method, and architecture that provide a reusable connection handle to a managed connection that can be shared, within a given sharing scope, such as a transaction, in software architecture on a computer platform. The preferred architecture is the J2EE software platform. The system includes a managed connection interface within the architecture, and a cleanup method within the managed connection interface where the cleanup method disassociates all the handles currently associated with the managed connection, causing them to enter a disassociated state. The cleanup method also resets the managed connection to a clean state such that it can be returned to a free connection pool for future reuse. Each connection handle preferably keeps key state information at the time it is disassociated from a MC, and can be an object within the architecture. At the end of each sharing boundary, the cleanup method would be called and the managed connection returned to the free connection pool. Thus, at the end of each sharing boundary all handles will be in a disassociated state.

The system can alternately include a separate dissociate method within the connection handle interface that can selectively disassociate one connection handle of a managed connection interface within the architecture. The system can also include a resource adapter, which is a pluggable component that implements the managed connection and the connection handle, within the architecture that selectively reassociates a disassociated connection handle with a managed connection within the architecture based upon the internal key handle information. The managed connection interface can further include a destroy method which, in addition to destroying the managed connection, invalidates all connection handles currently associated with the managed connection.

The inventive method for providing a connection handle to a shareable connection which can be used across multiple sharing boundaries in the software architecture includes the steps of associating one or more connection handles to managed connection within a sharing boundary within the J2EE architecture, then selectively disassociating one or more connection handles from a managed connection inteface within the J2EE architecture such that all connection handles enter a disassociated state and store key information which will later be needed to reassociate the handle. When the handle is again used, the handle will use the key information, working with the resource adapter and connection manager, to reassociate itself with a managed connection which is valid within its current sharing boundary. The inventive method also includes a method on the connection manager which takes a connection handle along with key information provided by the resource adapter, and finds an appropriate managed connection for the current sharing scope and associates the handle with that managed connection. The step of disassociating the handles can occur through calling the cleanup method on the managed connection, or through calling a separate disassociate method to disassociate individual handles.

The method further preferably includes the step of a invalidating the one or more connection handles through invocation of a destroy method. Further, the step of disassociating the one or more connection handles through the cleanup method preferably occurs upon ending of a sharing scope, such as at the end of a transaction. And the method can also further include the steps of selectively requesting one or more connection handles with a resource manager, and then selectively reassociating the connection handles through the resource adapter and connection manager thereby providing usable handles to the user.

The present invention therefore provides an advantage in that it does not require the system overhead necessary to track changes of states of handles with a container, as the managed connections are only associated with handles if and when the handle is actually used. An extra wasteful connection to perform "parking" is avoided.

Other objects, features, and advantages of the present invention will become apparent after review of the hereinafter set forth Brief Description of the Drawings, Detailed Description of the Invention, and the Claims.

DETAILED DESCRIPTION OF THE INVENTION

Figure 1:
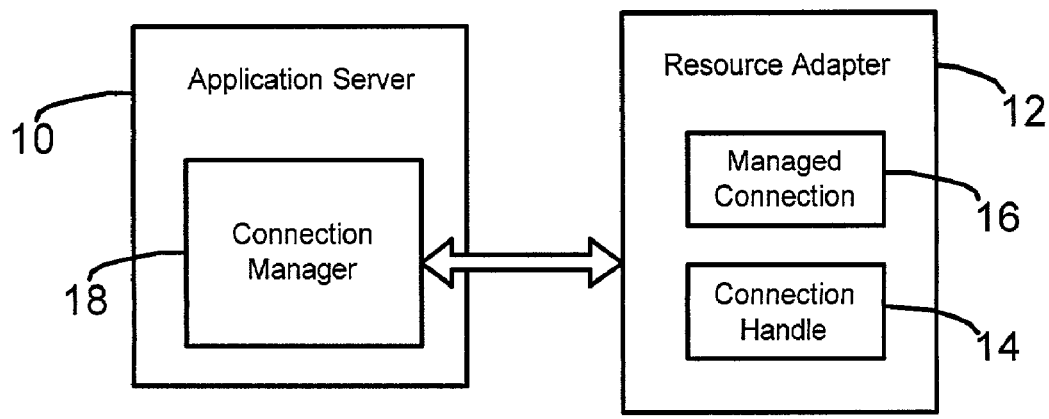
FIG. 1 is a block diagram of an application server having a connection manager interacting with a resource adapter having a managed connection interface and a connection handle, with their associated data and methods.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

With reference to the figures in which like numerals represent like elements throughout, FIG. 1 is an block diagram of the objects (or conceptual objects) comprising a system for providing a reusable connection handle for transactions in a software architecture, such as Java 2 Enterprise Edition (J2EE) software architecture, on a computer platform, such as a stand-alone processor, mainframe, ASIC or other platform as known in the art. The system includes a application server 10 interacting with a resource adapter 12, wherein the resource adapter 12 includes a managed connection interface 16 within the J2EE architecture, and the managed connection interface 16 that can include a cleanup method and/or a separate dissociate method that selectively disassociates one or more connection handles, such as a connection handle 14, from a managed connection within the J2EE architecture.

The "inactive/disassociated" state allows application servers 10 to disassociate connection handles 14 from managed connections 16 (e.g. a managed connection is moved to a free pool). In the present invention, after the cleanup method or disassociate method have been called, the one or more connection handles 14 then enters a disassociated state, i.e. non-parked, and each connection handle can have a discrete handle identifier as resident data or store its current usage state. However, such identification can also occur based upon handle properties or other identification criteria as known in the art. The resource adapter 12 is a pluggable component that implements the managed connection 16 and the connection handle 14, within the architecture and selectively reassociates a disassociated connection handle 14 with a managed connection within the architecture based upon an internal key stored within the connection handle 14.

To implement the system on a J2EE platform, several changes are made within the J2C architecture. The following SPI call to the connection manager 18 interface can be added:

void    associateConnection(ManagedConnectionFactory mcf,
    javax.security.auth.Subject subject,
    ConnectionRequestInfo cri,
    Object connection)

This call provides connection handles 14 with a mechanism to perform connection association when the connection handles 14 are inactive. The Subject and ConnectionRequestInfo parameters can be null for consistency with the ConnectionFactory's getConnection method, which takes no parameters in the container managed sign-on scenario. The above SPI method would be used by a connection handle 14 when an application attempts to execute an interaction and its state is inactive. It should be noted that the resource adapter 12 can leverages the support in order to implement connection handles 14. Further, the javax.resource.spi.ManagedConnection Interface, and the javax.resource.cci are modified. The resource adapter 12 can have a separate disassociate (Object connection) function added, and the existing managed connection 16 cleanup method can be changed. In its current form in the J2EE architecture, the cleanup method invalidates any connection handles that are currently associated. The cleanup method can also be modified to disassociate any handles that are currently associated. The cleanup method will thus disassociate all connection handles 14 from the managed connection 16 and place the connection handles 14 in a disassociated state. It is a resource adapter 12 responsibility to put enough state information in the connection handle 14 such that the next time the handle 14 is used, the resource adapter 12 can find another (or the same) managed connection to automatically associate with the connection handle 14

In the present invention, it is preferred that only the managed connection 16 destroy( ) method of the managed connection 16 can invalidate all connection handles 14. At the end of each sharing boundary, the managed connection 16 cleanup( ) method is called and the managed connection returned to the free connection pool. Thus at the end of each sharing boundary all connection handles 14 will be in a disassociated state.

In contrast to the prior art system, the present invention has moved the burden of tracking and reassociating connection handles 14 from the container, which has no way to determine if a component may use its connection handle 14, to the resource adapter 12, which can detect exactly when a connection handle 14 is being used. Such improvement removes significant server side-overhead in having containers track parked handles as is done in the prior art system. In the present system, a user will initially get a connection handle 14 and use it for a given transaction, and when the sharing scope is over, the connection manager 18 will call managed connection 16 cleanup, placing all connection handles 14 to the managed connection in a disassociated state preferably complete with enough of the currently managed connection state data to achieve reassociation to a compatible managed connection upon future use, and put the managed connection into the free pool. The next time the user desires to use the connection handle 14, the resource adapter 12, via usage state data or other handle identifier, detects that the connection handle 14 is in a disassociated state, uses the saved state information to request an appropriate managed connection from the connection manager 18, associates the managed connection 16 with the connection handle 14, and then services the request for the user.

The disassociate method is provided because there are times other than when the sharing scope ends that a connection handle 14 may need to be disassociated from a managed connection as would be known to one of skill in the art. Preferably, when the transaction exits a sharing scope, the cleanup method disassociates all connection handles 14 for that transaction. If, however, there is need to disassociate the handle from the managed connection 16 before the end of the transaction, then a separate disassociate method can be provided.

The system preferably includes a resource adapter 12 that interacts with a resource manager native to the J2C architecture which supplies the systems requests for one or more connection handles 14 when selected by a user. In one embodiment, the resource adapter 12 can selectively reassociate the connection handle 14 and provide the connection handle 14 to the connection manager, which hands the connection handle 14 to the user. Preferably, the connection handle 14 itself has a method to reassociate from its disassociated state. Alternately, the connection handle 14 can directly or indirectly invoke a reassociative method resident on another object in the system. Further, the connection handle 14 can be an object within the J2EE architecture, or alternately, can be a code segment or data resident on the platform, and can be shared with any other object on the platform as desired by the designer.

In operation on the J2EE platform, connection handles 14 are created when a user does a getConnection on a ConnectionFactory. If the user closes that connection handle before the end of the transaction then there is no handle to disassociate or reassociate. If, however, the user does not close the connection handle before the end of the transaction, then cleanup method will cause the connection handle 14 to enter the disassociated state and is cached it for future use. At some time in the future, within a new sharing scope/transaction, the user attempts to use the connection handle 14 and the handle checks its internal state. If disassociated, the connection handle 14 will reassociate itself, in a Resource Adapter 12 specific manner, to a valid managed connection within the new sharing scope and with the same properties as the last use of the connection handle 12. To accomplish the reassociation, an associateConnection( ) method can be created on the connection manager which is identical to the extant allocateConnection method, but additionally takes a connection handle as a parameter. The connection manager will either get a connection that is already in use in the current sharing scope, and has the same properties, or the connection handle 14 will get one from the free pool if available, or it will create a new connection handle 14 altogether.

Figure 2:
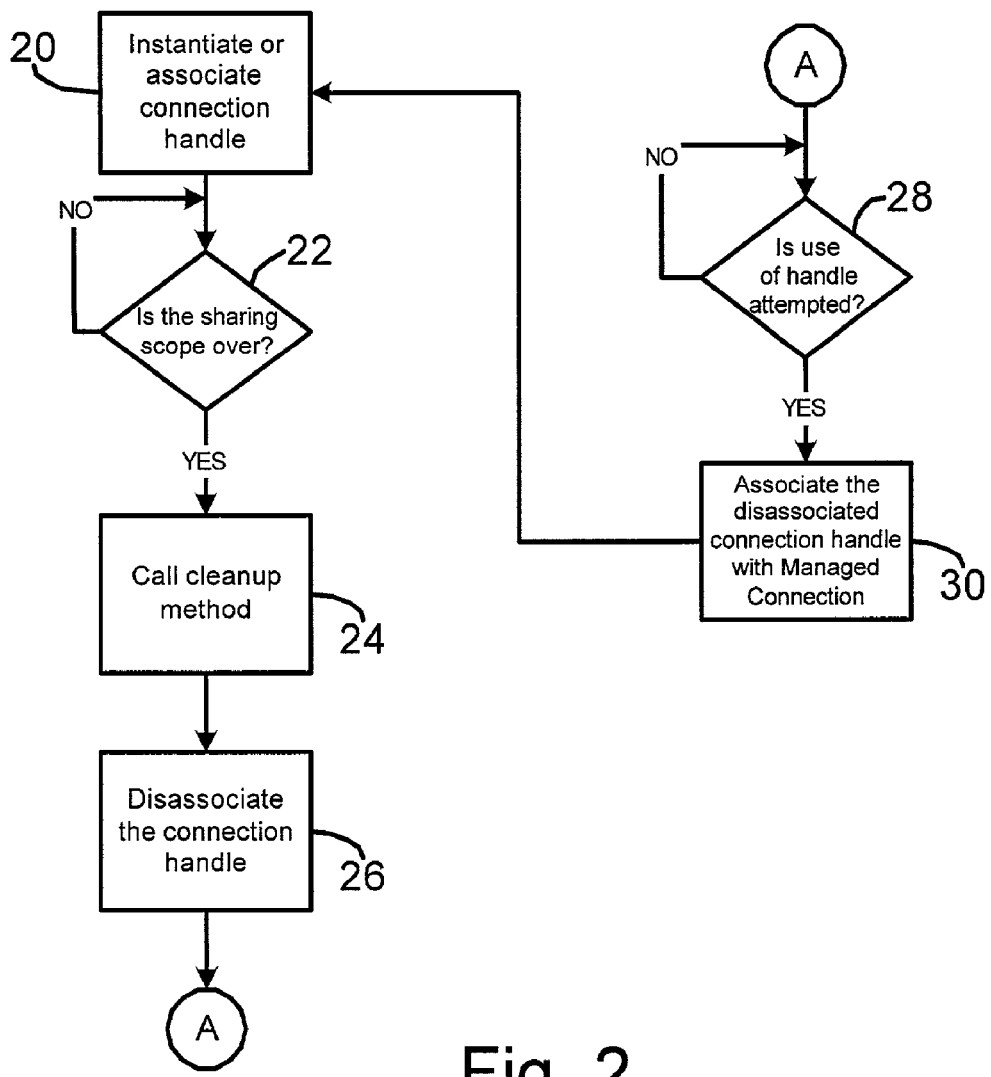
FIG. 2 is a flowchart of the system process of associating and disassociating connection handles for transactions.

As shown in the flowchart of FIG. 2, the present invention also provides a method for providing a reusable connection handles within sharing scopes such as transactions in a J2EE software architecture on a computer platform including the steps of instantiating or associating one or more connection handles 14 to a managed connection within a transaction through a managed connection interface 10, with the help of the connection manager, within the J2EE architecture, as shown at step 20, then determine if the sharing scope of the transaction is over, as shown at decision 22. If the sharing scope is not over at decision 22, the process enters a wait state until the sharing scope for that connection handle 14 ends. Otherwise, if the sharing scope is over at decision 22, the cleanup method is called as shown at step 24 (or the disassociate method if so embodied) and the one or more connection handles 14 are selectively disassociated from a managed connection interface within the J2EE architecture with such that the one or more connection handles enters 14 a disassociated state, as shown at step 26.

A determination is then made as to whether the user has attempted to use connection handle as shown by decision 28. At this time, the connection handle 14 can determine its state if so embodied. If the user has not attempted to use a connection handle 14 at decision 28, then the process again enters a wait-state until the user does request a connection handle 14. Otherwise, if the user has requested or attempted use of a connection handle 14 at decision 28, the connection handle is reassociated with a managed connection within the J2EE architecture through a resource adapter 12 within the J2EE architecture, as shown at step 30, where the reassociation is based upon the connection handle 14 identifier or usage state data preserved at disassociation, and the current sharing scope or transaction. The process then returns to iterate the life cycle of a connection handle 14 at step 20.

The method preferably further includes the step of invalidating the one or more connection handles 14 through invocation of a destroy method, such as a managed connection 16 destroy method of the managed connection interface, to properly invalidate handles so sharing violations are avoided. As shown above, the step of disassociating the one or more connection handles 14 with a cleanup method preferably occurs upon a transaction exiting a sharing scope or boundary, and the step of associating one or more connection handles 14 to a transaction is preferably associating each connection handle objects within the J2EE architecture to a transaction the next time it is used. If the system is embodied to utilize the Resource Manager of the J2C specification, the method can further include the steps of selectively requesting one or more connection handles 14 from the Resource Adapter 12, and then selectively reassociating the one or more connection handles 14 through the Resource Adapter 12 to thereby provide the handles to the Resource Manager.

Other alterations to the native tools on the J2EE platform as detailed in the J2C specification can be made to implement one or more of the functions described above, as would be apparent to one of skill in the art. For example, the managed connection cleanup method of can be resident within the resource adapter 12 and be activated by another function in the managed connection 16 interface. Thus, other functions and data could be moved between the objects as desired.

While there has been shown a preferred embodiment of the present invention, it is to be understood that certain changes may be made in the forms and arrangement of the elements and steps of the method without departing from the underlying spirit and scope of the invention as is set forth in the claims.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A system for providing a reusable connection handle for transactions in a software architecture on a computer platform, the system comprising:
    a managed connection interface within the architecture, the managed connection interface associated with a plurality of managed connections;
    a plurality of connection handles, each connection handle discretely identifiable within the architecture and selectively associated with a managed connection of the plurality of managed connections associated with the managed connection interface;
    a cleanup method within the managed connection interface, the cleanup method disassociating all of the connection handles from the managed connection associated with the managed connection interface within the architecture such that each connection handle enters a disassociated state, the cleanup method causing each of the connection handles to maintain key state information upon being disassociated from a managed connection; and
    a resource adapter within the architecture that selectively reassociates at least a selected one of the disassociated connection handles with a managed connection of the plurality of managed connections associated with the managed connection interface within the architecture, based on the key state information maintained by the selected one of the connection handles.

2. The system of claim 1, further comprising a dissociate method that selectively disassociates the connection handle such that the connection handle enters a disassociated state.

3. The system of claim 1, wherein the connection handle preserves its usage state data upon disassociation and the resource adapter selectively reassociates the disassociated connection handle based upon the usage state data.

4. The system of claim 1, further comprising a destroy method for invalidating the connection handle.

5. The system of claim 1, wherein the connection handle is an object within the software architecture.

6. The system of claim 1, wherein the ending of a transaction causes the cleanup method to disassociate the connection handle from the managed connection involved in the transaction.

7. A computer implemented method for providing a reusable connection handle for transactions in a software architecture on a computer platform, the method comprising the steps of:
    associating one or more connection handles to a managed connection within a sharing scope using a managed connection interface within the architecture, each connection handle discretely identifiable;
    disassociating all connection handles from the managed connection associated with the managed connection interface within the architecture such that each connection handle enters a disassociated state and causing each connection handle to maintain key state information upon entering the disassociated state; and
    selectively reassociating the one or more disassociated connection handles within a managed connection within the architecture based on the key state information maintained by the connection handle.

8. The computer implemented method of claim 7, wherein the step of selectively reassociating the one or more disassociated connection handles occurs through a resource adapter resident in the architecture.

9. The computer implemented method of claim 7, further comprising the step of invalidating the one or more connection handles through invocation of a destroy method.

10. The computer implemented method of claim 7, wherein the step of disassociating the one or more connection handles is disassociating all connection handles upon the ending of a sharing scope.

11. The computer implemented method of claim 7, wherein the step of disassociating the one or more connection handles is disassociating one connection handle before the ending of a sharing scope.

12. The computer implemented method of claim 7, wherein the step of selectively reassociating the one or more disassociated connection handles is reassociating the one or more disassociated connection handles based upon connection handle usage state information preserved at the time of disassociation.

13. The computer implemented method of claim 8, further comprising the steps of:
    selectively requesting one or more connection handles with a resource manager; and
    selectively reassociating the connection handles through the resource adapter thereby providing the handles to the resource manager.

14. The computer implemented method of claim 7, wherein the step of associating one or more connection handles is associating one or more connection handle objects within the architecture to a transaction within a sharing scope.

* * * * *